Patented Oct. 30, 1934

1,978,884

UNITED STATES PATENT OFFICE 1,978,884

METHOD OF RECLAIMING ALUMINOUS OXIDE GRAINS OR THE LIKE

Dell Mack Ramsey, Hamburg, N. Y., assignor to The Exolon Company, Blasdell, N. Y., a corporation of Massachusetts No Drawing. Application December 31, 1928, Serial No. 329,677

3 Claims. (Cl. 51—280)

This invention relates to the separation of certain bonded grains from their bonds to the end that such grains, freed of their bonds and any impurities incidental to the original bonding, may be reclaimed and re-used.

For the purposes of this application I shall discuss my invention in its adaptation to reclaiming from its bond the aluminous oxide grain, artificial or natural, used in the manufacture of abrasive wheels, turnings, etc., such grain having been either bonded by the vitrified bonding process in which event the bond consists of vitrified clay or any suitable fused silicate, or by the silicate bonding process in which event the bond consists of sodium silicate.

Both processes of bonding are in common use, and each presents problems peculiar to itself when it is attempted to reclaim the grain from its bond. In the vitrified process the bond is composed of suitable clays and fluxes which are mixed with the proper abrasives or refractory material. By varying the amount and composition of the bond, wheels, stones, retorts, etc. of different grades are obtained. The base of such bond is feldspar or a fusible clay to which is added a refractory clay to decrease the fusibility of the bond, but inasmuch as the possible combinations of clays that may be used for bonding are almost endless, no attempt will be made to give specific equations covering all chemical reactions taking place between the bond or any part of it and any chemical reactive substance which may be used to free the grain of its bond. Similarly, the mechanical procedure followed in preparing the clays for the mix, as the molding, truing, burning steps, etc. need not be here considered.

For the purposes of this discussion it may be assumed that the usual wheel made under the vitrified process as usually practiced and with usual bond contains crystalline aluminous oxide ($Al_2O_3$) fairly pure in most cases and that the bond holding the grain together is an impure aluminum silicate. Such a wheel is burned at a temperature wherein not only the combined water is driven off but in which an actual vitrification or melting together of the ingredients takes place. In other words, there is a chemical reaction between the aluminum silicate bond and the aluminous oxide grain by which the bond and grain were chemically united. This may be contrasted with the bonding of silicon carbide (SiC) by this same process wherein no chemical reaction takes place between the SiC and the vitrified clay (aluminum silicate) bond, the bond merely surrounding the SiC grains in a mechanical rather than a chemical grip.

In the silicate process the principal ingredient used in the bond is silicate of soda. In such process silicate of soda and the abrasive grain are thoroughly mixed together, molded, dried and baked in special ovens from which all fire gases are excluded whereby to cause the bond to harden or set.

In both the vitrified and the silicate process, the bond is a silicate of some kind, though principally an aluminum silicate and a sodium silicate, and the grain has been chemically rather than mechanically united to the bond, the clay or the sodium silicate, as the case may be. Since this is so, any mechanical treatment of the scrap such as by crushing, grating, screening, mulling, etc., to separate the grain from the bond is necessarily of limited effectiveness. Unlike the case of a bond which acts merely mechanically to grip on the grain or which involves no chemical reaction to hold the grain, as in the bonding of silicon carbide, the silicate penetrates chemically into the oxide upon vitrification, resulting in a chemical union of the grain and bond which cannot be wholly released by mere mechanical action. Moreover, the depth of this union varies with the grain, the clay, the temperature at which the grinding wheels or other articles were burned, etc., so that when such articles have been scrapped and broken up into individual grains, these grains are only partially freed from their bond, some of which remains united with the grain in the form of thin films on the grain surfaces and slightly deeper layers in the interstices of the grain. After crushing or equivalent mechanical treatment, therefore, the individual grains are still coated principally with silicate of aluminum and accompanying impurities of the silicate, such as the oxides of titanium, magnesium, calcium, etc., and it is to the removal of such coating and impurities to the end that the crystalline alumina shall be thoroughly freed from its bond that my present invention is particularly directed.

I am aware that it has been heretofore proposed to treat abrasive wheel scrap or the like by fritting the aluminous grain with borax or equivalent assimilating agent, or by the use of the autoclave with the grain in chemical solution under pressure, but such methods are involved and entail expensive equipment and high operating costs. My process on the contrary recommends itself on account of its simplicity and low machinery and operating costs.

Briefly, I first break up the abrasive wheel scrap into individual grains. This may be done by any convenient mechanical treatment as by crushing, screening, milling, mulling, magnetic or gravity separation, furnacing to oxidize carbon or foreign matter, re-mulling, etc.

After thus partially freeing the aluminous grain from its bond, I next chemically treat the grains to remove such of the bond and impurities remaining thereon. Such chemical treatment involves the use of some substance which will react with the silicate and change it into a form wherein it can be readily removed. For this purpose I prefer to use sodium hydroxide (caustic soda) under the following conditions and methods.

The grain slightly coated with the bond after mechanical treatment is dipped in a solution of sodium hydroxide, is then drained of excess solution, and baked over a hot plate or equivalent drying surface at a temperature well under 1000° F. thoroughly to dry the same. Temperatures of from 350° F. to 600° F. have been found sufficient in most cases to effect complete drying. When so treated the following reactions occur:—

The aluminum silicate bond ($Al_2O_3SiO_2$) reacts with the sodium hydroxide solution (NaOH) in which the mechanically treated grain is dipped to form an aluminum hydrate ($Al_2O_3H_2O$) and an hydrous sodium silicate ($NaO_2SiO_2H_2O$), i. e.:

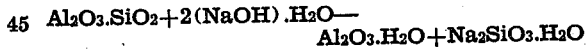

Bond+caustic soda—Aluminous hydrate+ hydrous sodium silicate $Al_2O_3.SiO_2+2(NaOH).H_2O—$
$Al_2O_3.H_2O+Na_2SiO_3.H_2O$ This reaction occurs during the baking process which is at a heat under that which will drive off combined water, but does not make itself manifest until after further treatment of the grain. Such further treatment involves mulling the baked grain first in a rinse water to remove excess sodium hydroxide (caustic soda) or that which did not react with the bond, and afterwards mulling or agitating the grain in sulphuric acid ($H_2SO_4$). When this has been done, it becomes evident that the reaction between the sodium hydroxide and the small particles or thin films of the bond has occurred, for aided by the mulling, the sulphuric acid reacts with the resultants of the above equation to form a sulphate of aluminum $Al_2(SO_4)_3$, a sulphate of sodium ($Na_2SO_4$) and a silicic acid gel ($H_2SiO_4$) all of which separates in the mulling and is readily rinsed away. Such rinsing is continued until the rinse water is substantially free from contamination.

Generally speaking, therefore, it may be said that the sodium hydroxide reacts with the aluminum silicate to form hydrate of aluminum and hydrous silicate of sodium, these latter reacting with the sulphuric acid to form an impure hydrogel of silicic acid which with added water is rinsed off. If allowed to stand the water evaporates and the hydrogel is left as a colored jelly-like mass, with the powdery impurities of the sulphates apparent on top and around the edges of the mass. By thus treating the grain with an agent which will react with the silicate of the bond to change it to a form in which it can be readily removed from the grain I secure results that are not possible with the ordinary reclamation processes now employed. While I prefer to use sodium hydroxide as the reactive agent I recognize that other equivalent reactive agents may be used. I also recognize that many variations in method and treatment may be employed according to the particular nature of the bond or grain and the foregoing treatment is therefore only given as illustrative, since obviously it would be impossible to give any single combination of chemical equations to cover all conditions and variables employed. All such, however, as fall fairly within the spirit and scope of my invention as above defined are to be regarded as included therein.

Specifically, I would mention the equivalency of potassium hydroxide for sodium hydroxide for which it may be substituted in the above cited instances. Also, hydrochloric acid may be substituted for sulphuric acid.

In reclaiming silicon carbide (SiC) retorts, the bond has only a mechanical grip on the grain, but the bond and grain are contaminated during the use of the retort by such impurities as were introduced into the containers under the influence of high temperatures to such an extent that the silicate bond carries so much impurity that the reactions are somewhat retarded. However, by an occasional repetition, the desired results may be obtained by my process with this type of bonded grain.

While I have discussed my invention in its adaptation to the reclamation of aluminous oxide grains from their bonds, it will be understood that this treatment is purely illustrative and in no way limiting and that the principles of my invention may be applied to the reclamation of any bonded grain such as silicon carbide or any natural or artificial grain bonded by the vitrified or silicon bonding processes, and that this is true regardless of the form in which the grains have been manufactured as retorts, wheels, stone, etc. or the use to which such manufactured articles have been put.

What I therefore claim and desire to secure by Letters Patent is:

1. In the method of reclaiming the abrasive grains from the aluminum silicate and refractory bond with which they are bonded, the steps which consist in coating the bonded grain with sodium hydroxide, in drying the sodium hydroxide on the grain by heating the grain to a temperature which will produce a reaction between the sodium hydroxide and the bond to form an aluminum hydrate and an hydrous sodium silicate, in thereafter rinsing the heated grain to remove any sodium hydroxide which did not react with the bond, and in finally mulling the treated grain in an acid which reacts with the aluminum hydrate and the hydrous silicate of sodium to produce an impure hydrogel of silicic acid which may be readily washed away.

2. In the method of reclaiming the abrasive and refractory grain from the aluminum silicate bond with which they are bonded, the steps which consist in first subjecting the grain to mechanical treatment to partially free the grain from the bond, in next coating the bonded grain with sodium hydroxide, in drying the sodium hydroxide on the grain by heating the grain to a temperature which will produce a reaction between the sodium hydroxide and the bond to form an aluminum hydrate and an hydrous sodium silicate, in thereafter rinsing the heated grain to remove any sodium hydrate which did not react with the bond, and in finally mulling the treated grain in an acid which reacts with the aluminum hydrate and the hydrous silicate of sodium to produce an impure hydrogel of silicic acid which may be readily washed away.

3. The reclamation method as claimed in claim 2 wherein the acid used to produce said second reaction is sulphuric acid.

DELL MACK RAMSEY.